US 8,069,691 B2

(12) United States Patent
Murgatroyd

(10) Patent No.: US 8,069,691 B2
(45) Date of Patent: Dec. 6, 2011

(54) CLEAVING APPARATUS

(75) Inventor: Ian Murgatroyd, Warwickshire (GB)

(73) Assignee: Oxford Fiber Ltd., Warwickshire (GB)

( * ) Notice: Subject to any disclaimer, the term of this patent is extended or adjusted under 35 U.S.C. 154(b) by 0 days.

(21) Appl. No.: 12/067,503

(22) PCT Filed: Sep. 25, 2006

(86) PCT No.: PCT/GB2006/003536
§ 371 (c)(1),
(2), (4) Date: Mar. 20, 2008

(87) PCT Pub. No.: WO2007/034205
PCT Pub. Date: Mar. 29, 2007

(65) Prior Publication Data
US 2008/0245836 A1    Oct. 9, 2008

(30) Foreign Application Priority Data

Sep. 23, 2005  (GB) .................................. 0519448.5
Jul. 19, 2006  (GB) .................................. 0614284.8

(51) Int. Cl.
*C03B 37/16*    (2006.01)
(52) U.S. Cl. ......................................... 65/433; 225/96.5
(58) Field of Classification Search ............. 225/2, 96.5; 65/433
See application file for complete search history.

(56) References Cited

U.S. PATENT DOCUMENTS

| | | | |
|---|---|---|---|
| 4,183,619 A * | 1/1980 | Makuch | 385/82 |
| 4,503,744 A * | 3/1985 | Garner et al. | 83/879 |
| 4,948,222 A * | 8/1990 | Corke et al. | 385/100 |
| 5,829,659 A * | 11/1998 | Mansfield et al. | 225/2 |
| 5,838,850 A | 11/1998 | Mansfield et al. | |
| 6,578,747 B2 * | 6/2003 | Murgatroyd | 225/96.5 |

FOREIGN PATENT DOCUMENTS

| | | | |
|---|---|---|---|
| WO | 9854608 A1 | | 12/1998 |
| WO | WO 9854608 A1 * | | 12/1998 |
| WO | 0041013 A1 | | 6/2000 |

OTHER PUBLICATIONS

European Examination Report for Application No. 06 779 533.6, mailed Feb. 3, 2011, 10 pages.

* cited by examiner

*Primary Examiner* — Matthew Daniels
*Assistant Examiner* — Yana Belyaev
(74) *Attorney, Agent, or Firm* — Brooks Kushman P.C.

(57) ABSTRACT

A method of cleaving an optical fiber and apparatus therefor including a hand tool wherein the optical fiber to be cleaved (6) has a natural path. The method of cleaving includes deflecting the optical fiber (6) away from its natural path in a first direction and at a point spaced longitudinal along the length of the fiber deflecting the optical fiber in a second direction opposed to the first direction. The opposing deflection induce internal stresses in the fiber that extend substantially across the core of the optical fiber over a region of the length of the optical fiber. The fiber may then be scratched in this region with a cleaving blade (5) so as to induce cleaving of the optical fiber. The cleaving is controlled by controlling the internal stresses induced in the fiber by in turn controlling the degree of deflection induced in the fiber. Further the fiber (6) may be placed under extension to assist in the control of the stresses induced.

5 Claims, 12 Drawing Sheets

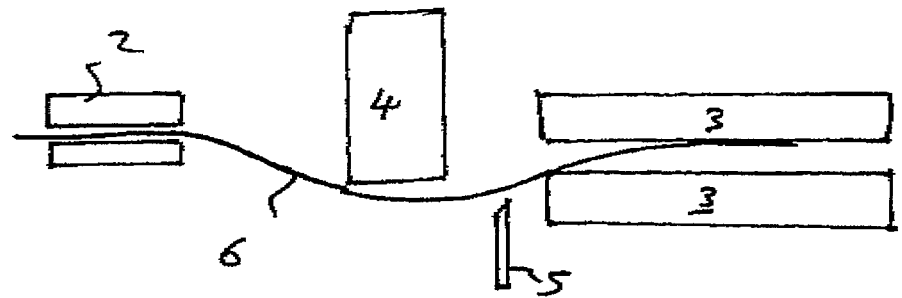
Fig One
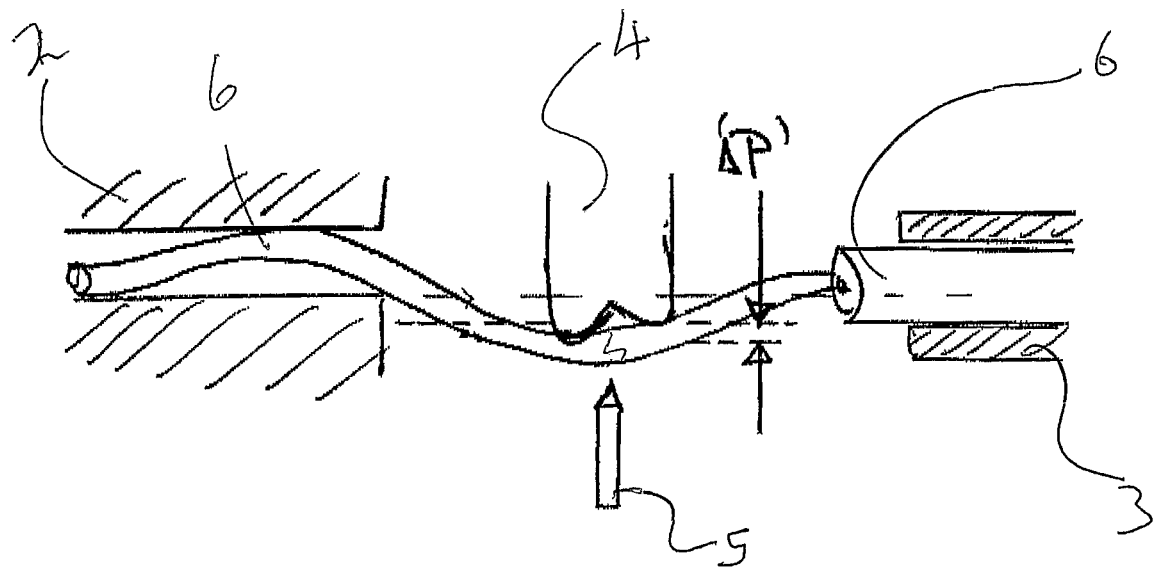
Fig 1F

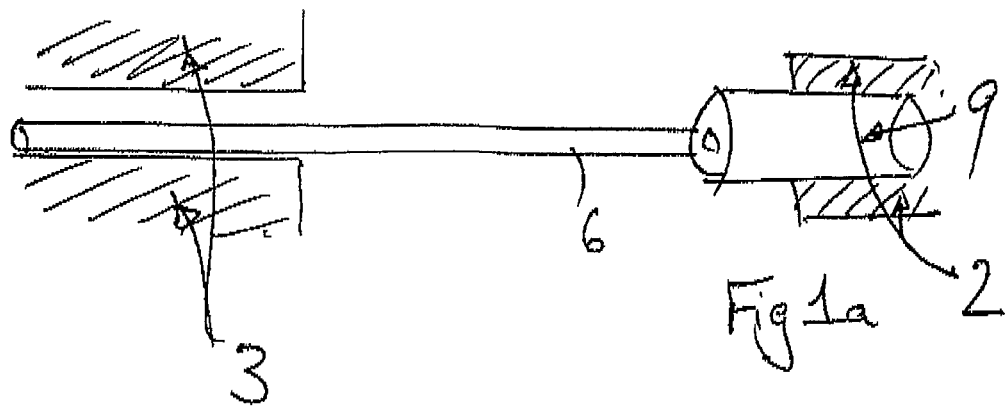
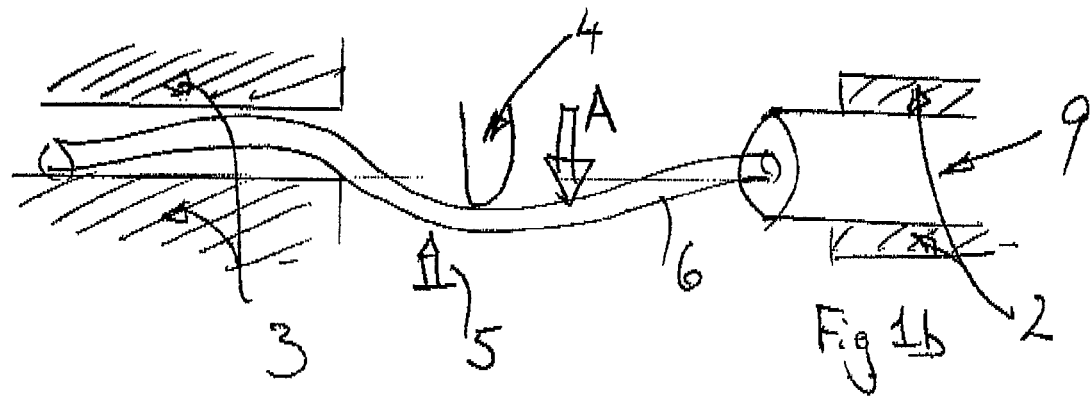
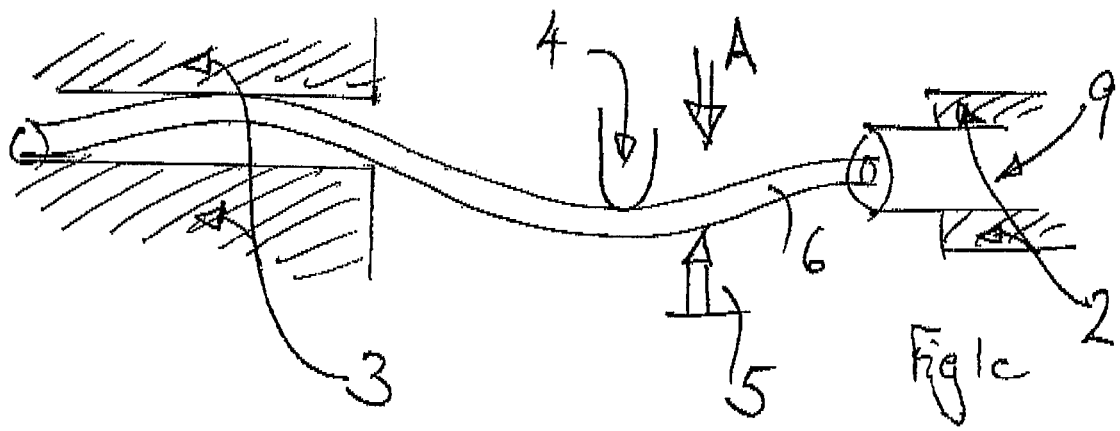

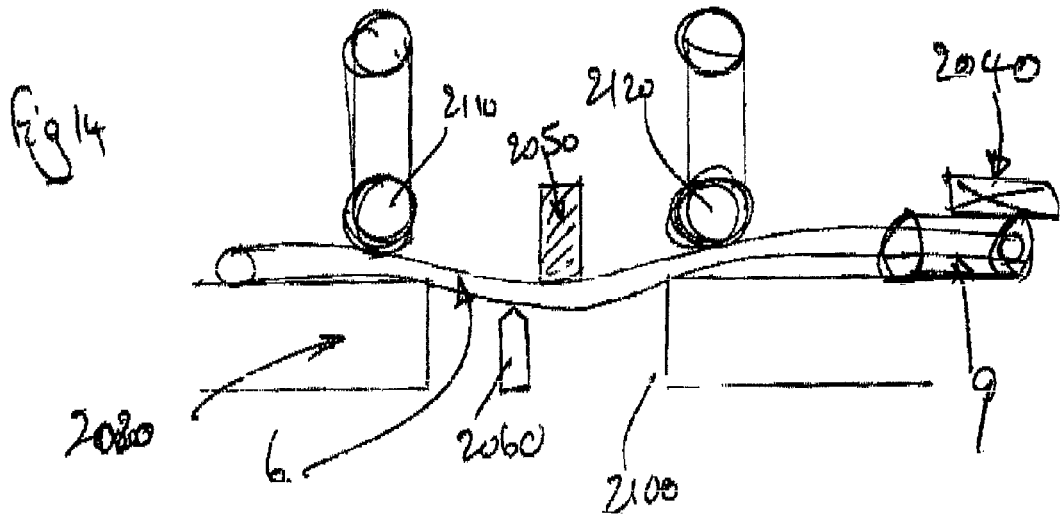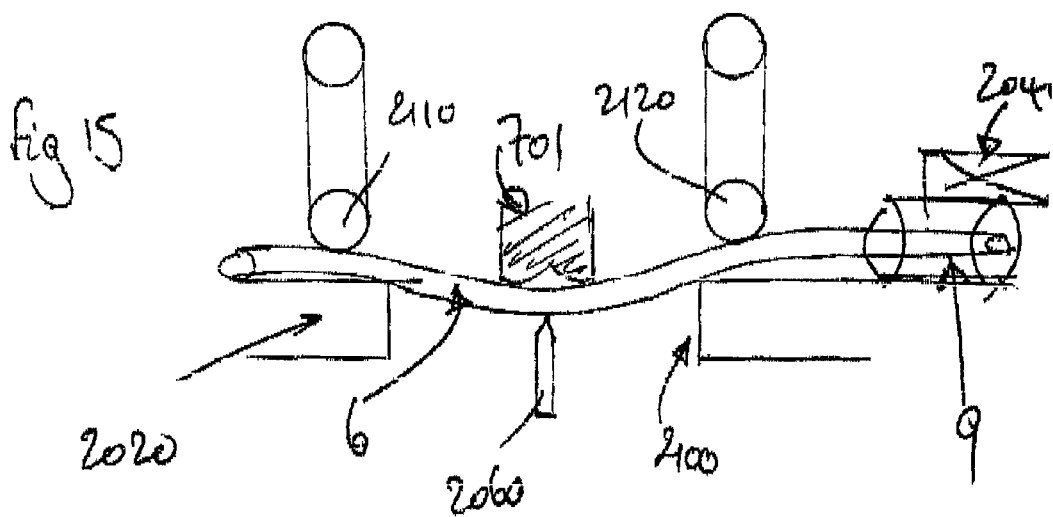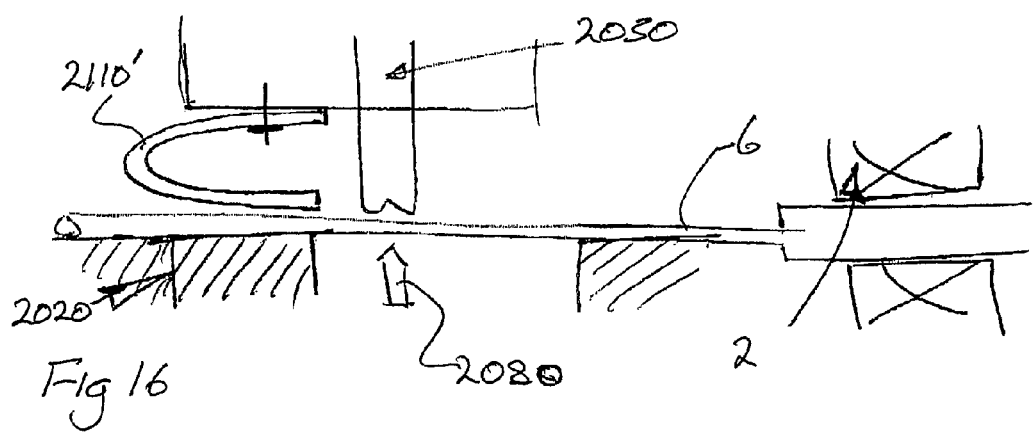

CLEAVING APPARATUS

This invention relates to cleaving of optical fibers including a method of cleaving an optical fiber and apparatus including the method of cleaving an optical fiber, in particular, cleaving an optical fiber which is clamped in one or more controlled ways.

Transmission of data using optical fibers is a well known, and advantageous method of communication. The use of optical fibers is, for example, extremely common in the telecommunications, automotive and aerospace industries. Optical fibers, and the use of such optical fibers, have many advantages over the still more common copper cable based systems, including, for example, immunity from electrical interference and increased data transmission rates and accuracy.

An optical fiber generally consists of a long strand of silica glass, the center of which has a differing refractive index to the surrounding glass, causing optical confinement of the light in the core of the fiber. Each fiber, and particularly the core of each fiber, requires proper termination so that individual sections of optical fiber can be joined together so that light can cross from one fiber to the next, for example, where the fiber passes through a bulkhead or where optical transmitters or detectors require attachment to the fiber. Joins are typically made using specialist connectors, such as mechanical splices or the like.

Proper termination of the optical fiber requires that an end surface of the fiber is left substantially planar and atomically smooth, at a predetermined angle to the axial center of the fiber, thereby allowing the unhindered passage of an optical signal across the join. The end surface is usually required to be substantially perpendicular to the axial center of the fiber. However, some applications require other predetermined angles to be utilised.

Perpendicular end surfaces, for example, can result in approximately 4% of the light transmitted through the fiber and across the join being reflected back down the optical fiber. However, terminating the end surface at a predetermined angle of approximately 8° from the perpendicular substantially eliminates back reflections.

Typically, termination is achieved by cleaving the optical fiber, to give an end surface of the desired quality, at the predetermined angle, and cleaving is generally preferred because it is simple and, hence, more convenient than alternative techniques such as end polishing.

Typically cleaving involves scratching the silica region of the optical fiber to produce a starter crack, after removal of a section of its protective coating for access of the blade to the silica, whilst tensioning the silica region to cause the crack to propagate to complete the cleave.

Typically, application of a tensile force of a few Newtons is sufficient to cause immediate cleaving of the fiber once a starter crack has exceeded a certain critical depth of only a few microns. Once initiated, the cleave propagates generally perpendicular to the internal stresses in the fiber. For example, if the applied tension is exactly axial, the cleaved end will be substantially perpendicular to the central axis of the fiber.

However, applied tensile forces with non-axial components can result in non-perpendicular cleaved ends. Therefore control of the non-axial components may be utilised in order to produce a cleave at a particular predetermined non-perpendicular angle, additional uncontrolled non-axial components are highly undesirable. Such uncontrolled components can often arise, for example, from the twisting or shearing of the fiber.

Furthermore, excess tension can result in the crack propagating with excess energy, which can cause it to branch undesirably, leaving a roughened quality to the surface. Conversely, insufficient applied tension results in the critical crack depth, required to initiate propagation, being too large. Such a large critical crack depth requires a force to scratch the fiber which is so large that displacement of the fiber can occur, leading to uncontrolled end angles, damage to the blade used to scratch the fiber, etc.

The tension and/or the depth of the starter crack required to cleave the fiber can be reduced by bending the fiber slightly prior to scratching, using for example an anvil. The use of an anvil has the further advantage that it can be used to resist the cutting force required to introduce a scratch thereby allowing more controlled cleaving. For example, an applied tension of approximately 2 Newtons applied to a 125 micron diameter silica strand, having an anvil induced deflection of about 125 microns, will cause cleaving for a starter crack of depth 2 to 3 microns. Larger diameter fibers require greater tensions, approximately proportional to the cross sectional area of the fiber, to initiate cleaving.

A common aspect associated with a large number, if not all, cleaving tools currently available relates particularly to the means of holding the fiber to be cleaved in the tool prior to initiation of the cleaving operation. Control of the direction and quality of the cleave requires control of the internal stresses in the fiber(s). It has been thought that, in order to propagate the starter crack as a cleave across the fiber(s), the fiber(s) needed to be tightly held at two points to maintain tension in the fiber. For example, the FK11 tool from Photon Kinetics (Oregon, USA), the RXS tool from Siemens (Germany) and the AFC tool from Oxford Fiber (Rugby, UK) all use metal clamping surfaces to clamp and trap the fiber(s). Such clamping between the metal and the glass of the fiber(s) can lead to damage to the fiber(s), damage to the clamping surfaces and difficulty in clamping more than one fiber because all fibers in a ribbon need to be held and stressed independently and equally.

The present invention is concerned with overcoming or in the least alleviating the above mentioned problems associated with clamping the fiber(s) so that the internal stresses required to propagate the cleave can be controlled. Specifically this invention deals with using the deflection of the fiber from its natural path at or near to the cleave point to induce internal stresses in the fiber to propagate and control the cleave In accordance with the present invention an optical fiber which has a natural path is cleaved by deflecting the optical fiber away from its natural path in a first direction and spaced longitudinal along its length deflecting the optical fiber in a second direction opposed to the first direction so as to induce internal stresses in the fiber that extend substantially across the core of the optical fiber over a region of the length of the optical fiber and scratching the surface of the optical fiber in the region with a cleaving blade so as to induce cleaving of the optical fiber wherein the cleaving is controlled by controlling the internal stresses induced in the fiber.

When an optical fiber is deflected, or bent, and then caused to re-bend substantially back on itself, for example forming a "S-bend". The shape of the re-bend used to effect the cleave can be a simple curve arrangement or alternatively a more complex shape. Internal stresses are induced in the optical fiber as a result of the re-bend that extend longitudinally along the optical fiber for a portion of its length, these stresses will be present also across the width of the fiber or a significant portion of the width of the fiber.

It will be appreciated by those skilled in this field that deflection or bending an optical fiber induces stresses that are related to the magnitude of the deflection or bend and that for a simple curve the optical fiber will be in extension on the outer side of the curve and compression on the inner side of the curve. Further the internal stresses will vary between extension forces and compression forces, as well as magnitude, across the width of the fiber and in the transition there will be a neutral zone when no internal stresses are effectively present.

As will be understood by a man skilled in the art when an optical fiber is cleaved the extensive stresses in the fiber provide a degree of control to the cleave which enables cleaving in a determined plane. This plane can be either perpendicular to the optical fiber or at an angle to the perpendicular. However, when the cleave passes into or through an area where the stresses in the optical fiber are not high enough, or through a region where the stresses are zero—known as the neutral axis—or a region where the stresses are compressive, the control of the cleave is lost and the path of the cleave takes on an uncontrolled nature. This can lead to a spur forming on one end of the cleaved optical fiber during cleaving. It is therefore important that the extensive stresses induced in the fiber are induced in such a manner as to allow the control of the internal stresses to extend across the width of the core of the optical fiber.

The provision of a simple deflection or bend in a fiber is not normally sufficient to control the stresses in the region of the core of the fiber and so the resultant cleave will be uncontrolled in the region of the core of the fiber and light will not traverse the termination of the fiber.

It is the control of the curvature, therefore, that provides a means by which the induced stresses within the fiber can be controlled in order to facilitate cleaving of the fiber in a controlled manner.

Further the optical fiber may also be placed under extension in the longitudinal direction. This provides a means by which the location of the neutral axis in the deflected fiber can be moved across the width of the fiber.

Typically an optical fiber includes a plastic coating about an optical glass strand. The coating is provided to protect the glass strand of the fiber, and to facilitate efficient cleaving of the optical fiber has to be stripped from an end section of the fiber to expose the glass strand. Normally it is the end section of the fiber which is cleaved and on which a cleaving tool will operate. The present invention utilises the deflection of the glass strand to induce the internal stresses needed in the fiber to enable efficient cleaving and therefore the end section of the optical fiber does not necessarily need to be held. For example, deflection of the optical fiber can be achieved by movement of components in the apparatus and therefore the optical fiber will be constrained but is not trapped. This can be referred to as "non-trapping" clamping of the optical fiber.

Further to facilitate the cleaving of the fiber the fiber may be clamped remotely of the cleave area, being clamped around the coated fiber.

Yet further to facilitate the cleaving, the fiber(s) may be contained within a ferrule(s) or other containing member(s), distant from or adjacent to the stripped section of the fiber(s), wherein the ferrule is clamped and the fibers contained therein are therefore clamped.

Typically all presently available cleaving apparatus use a clamping system which traps the optical fiber in the region of the fiber in which the cleave will take place, a load is directly applied to the fiber with this arrangement. This type of arrangement is referred to as "hard" clamping, i.e., the fiber is constrained from moving in the presence of a longitudinal force As will be well appreciated by the man skilled in the art with "hard clamping" systems there is a significant chance that the glass strand may be damaged.

In the present invention the non-trapping nature of the cleaving system means that this problem of damaging the fiber with the load applied in trapping the fiber is overcome.

Further with conventional systems the trapping clamps mean that the space in the vicinity of the cleave is cluttered and access of the cleaving blade to the fiber to effect the cleave inhibited. The present invention negates the need for close clamping means and this problem is also overcome.

The invention also envisages an intermediate clamping system, referred to as "soft clamping" in which the fiber is partially trapped but able to move longitudinally through the clamp if the force exceeds a certain value. "Non-trapping" clamping does not provide significant resistance to longitudinal movement of the fiber through the clamps.

The advantages that are available with non-trapping, or soft clamping, cleaving includes:

surfaces of the clamps will not be damaged by excess pressure when trying to "hard clamp" an optical fiber for cleaving:

fiber will not be damaged because lower clamping pressures than required are used;

ribbon fiber cleaving becomes an easy and repeatable operation;

optical fiber off cuts can be disposed of more easily;

lower tolerances will be required in order to clamp fiber off cuts leading to reduction in the cost of the production units for such cleaving tools;

the offcut could be used as an optical jumper for transmitting optical signals over distances as short as 3 mm (very difficult to achieve if you are hard clamping); and mechanical optical splicing tools that involve butting together of angled cleaves (reducing back reflection) are possible.

Apparatus provided for cleaving an optical fiber in accordance with the first aspect of the present invention, which optical fiber passes through the apparatus along a natural path and has an end section thereof in which the glass strand of the fiber is exposed, includes means to deflect the optical fiber from its natural path in a first direction; means to deflect the optical fiber from its natural path in a second direction in opposition to the first direction; and means to scratch and cleave the optical fiber wherein the end section of the optical fiber may or may not be trapped and the deflection of the optical fiber induces the fiber to re-bend so that internal stresses in the fiber over a region of the length of the fiber are induced and the means to scratch is operated to scratch the surface of the fiber in the region and the cleave induced.

In accordance with the present invention the end section of the optical fiber may or may not be trapped but is preferably confined.

In one arrangement of the present invention the apparatus also acts to apply a longitudinal extension force to the optical fiber. In order to effect this the coated strand portion may be "hard" clamped remotely of the cleave site. This clamping will be in a region of the fiber where the strand is protected by the protective jacket of the fiber.

The apparatus may also include an anvil. Any conventional type of anvil may be used for example a single arm or double arm arrangement. In the instance where a perpendicular cleave is required the preferred option is a single pole anvil. However in the instance where an angled cleave is required a twin pole or arm anvil is preferred. The arms/poles of the anvil can be preset to provide a defined angle of cleave and/or the anvil arrangement may be rotated about as fulcrum to provide the desired angle of cleave.

In one embodiment of the present invention, the means to deflect the optical fiber from its natural path may include at least one guide rod which guide rod is movable in relation to the fiber so that it deflects the optical fiber from its natural path inducing the necessary internal stresses in the fiber.

The guide rod may be formed with means, for example, a groove, in its surface to enable the optical fiber being deflected to be located and correctly aligned with regard to the guide rod to facilitate accurate cleaving. The groove may be formed so that when the fiber is located within the groove said fiber will extend above the sides of the groove. This will enable ready access for a blade to scratch the fiber and, therefore, facilitate cleaving of the fiber.

The guide rod may be formed from any suitable material, or may be coated with any suitable material. The guide rod may be formed, or coated, with a material that acts to grip the material of the coating of the optical fiber.

Alternatively the means to deflect the optical fiber may comprise two plate like components between which the end section of the optical fiber is located. Further still components of the apparatus, for example the anvil or the blade may include or comprise the means to deflect.

In an arrangement of the apparatus of the invention the means to deflect the end section of the optical fiber in a first direction comprises a guide rod and the means to deflect the optical fiber in a second direction comprises two flat plates like members that confine the optical fiber inducing the necessary deflection to induce the internal stresses.

In an alternative arrangement of the invention the means to deflect the optical fiber comprises a ferrule located over the end of the fiber to be cleaved and the optical fiber is located loosely, so that it is not trapped, between closely orientated components so that the ferrule can be moved to induce a S-bend in the fiber. The optical fiber is then cleaved in the normal manner. If an angled cleave is to be induced in the fiber the ferrule can be located so as to present the fiber for the correct angle of cleaving. However if a perpendicular cleave is desired a further component, for example anvil, or guide rods may be used to correctly orientate the optical fiber for cleaving.

Apparatus made in accordance with the present invention may be used to cleave either single optical fibers or ribbon arrayed optical fibers.

In the latter example where a ribbon fiber array is being cleaved the methodology of the present invention is used in a technique in which a window is opened in the encapsulation surrounding the ribbon array so as to allow access to the optical fibers and allow deflection by an anvil and scratching by a blade in accordance with the present invention In the example of the cleaving of an optical fiber ribbon array the ribbon has to have the encapsulation coating on the ribbon removed to provide blade access to the optical fibers so that the ribbon array can be cleaved. The ribbon encapsulation may be removed using the following method detailed below wherein the ribbon is placed in a stripping tool, for example a thermo mechanical stripping tool which is heated to approximately 85°-90° C. to facilitate stripping of the ribbon coating. However, other means may be used to remove the encapsulation for blade access including laser ablation, laser or arc heating or heating by use of a jet or bursts of hot air.

The elevated temperature is sufficient to break the bond between the coating and the glass fibers, allowing easy removal by pulling off the coating. However, if the coating tube is only partly pulled off, a glove of coating remains over the fibers and if the ribbon is allowed to cool, the coating partially reforms a bond with the optical fibers, providing resistance to further removal of the coating glove from the fiber ribbon. This coating glove can be used to clamp the fibers contained therein during subsequent operations such as cleaving.

The encapsulation of the ribbon fiber may be window-stripped as follows:
  the encapsulated ribbon is located in a fiber clip that is placed in a thermal stripping tool so that approximately 22 mm of the distal end of the coating is removed
  the ribbon is repositioned in the clip with approximately 33 mm protruding and replaced in the thermal stripper. The stripper may be placed in a jig with a stop to limit the distance the second piece of coating is pulled off by the stripping tool to about 10 mm
  the ribbon has now been window stripped.

The ribbon comprises a length of stripped fibers bounded on one side by the untouched encapsulation and on the other by the partly stripped coating glove The window-stripped ribbon, still located in the clip may be placed in a cleaving tool and cleaved in accordance with the present invention as follows:
  clamping each of the fiber(s) at two points by clamping through the coating
  tensioning each of the fibers by deflecting the fiber(s) laterally between the clamps using an anvil
  bending and/or shearing the fiber(s) using the anvil to change the stress profile in the fiber(s) and to provide resistance to the scratching means
  scratching the stressed fiber(s) with a sharp edge such as a diamond blade In this cleaving process:
  perpendicular cleaves for subsequent splicing are obtained by using a two armed anvil and scratching there between
  angled cleaves for reduced back-reflection are obtained by using an anvil to shear the fiber between the anvil and the clamp prior to scratching with the blade, as taught by Murgatroyd in PCT/GB98/01598. The anvil used may be a one armed/post anvil or alternatively a two armed/post arrangement. If a two arm/post arrangement of anvil is adopted the fiber would be bent non-symmetrically, e.g. when the arms of the anvil are of unequal length, the anvil does not act centrally in the gap or when the clamping surfaces on either side of the blade are of different heights The above-described cleaving technique may be adapted for ribbon cleaving and enables reliable ribbon cleaving to be readily obtained. In one example a 4-fiber perpendicular cleave achieved end angles within 0.5° of perpendicular for all 4 fibers, and a 4-fiber angled cleaving achieved end angles across the core 8° away from perpendicular within ±1° for all fibers. The cleave lengths achieved were all the same to within 25 microns.

The above description describes where the coating is removed for blade access to the fiber(s) that are scratched and cleaved due to their internal stress induced by deflection from their natural path. However, this invention also includes the case in which the coating is not removed, rather the glass is scratched through its coating, causing a starter crack to be generated in the fiber which spreads due to the internal stresses induced in the fiber(s) by their deflection to effect the cleave. Scratching the glass through its coating is used when the coating is either thin or difficult to remove, as in the case of thin polyimide coatings.

The above description includes a blade to scratch the fiber (s) and this may be in the form of a linear sharpened blade, e.g. made from diamond or other hard material, or in the form of a circular sharpened blade or blade of other shape or material. To create the scratch, the blade may be moved in to the fiber or vice-versa. The angle of attack may be perpendicular, tangential or intermediate. One example is seen in the tool made by Fujikura, Japan and others, in which a circular, sharpened metal or carbide blade is passed under the fibers, and its height adjusted to just touch and so scratch the fibers. Another example is seen in the tool made by Oxford Fiber, UK in which a linear, sharpened diamond blade is driven at a glancing angle of about 20 degrees from the tangent.

Other applications are also envisaged where photosensitive window-stripped fibers are each clamped through their coatings and are introduced in to an apparatus for writing Fiber Bragg Gratings (FBGs) in to the stripped fibers by illumination with UV light through a phase mask. The clamping of each of the fibers allows the fibers to be tensioned prior to production of the FBGs so that the operating wavelength of the FBGs when the tension is released can be controlled using a single-phase mask.

In one particular embodiment of the present invention the apparatus in accordance with the present invention includes one or more members, for example, an "O" ring, which are provided to soft clamp the coated optical fiber(s). In this arrangement the members ("O" rings) trap the coated fiber against a second surface, for example, the reference plane of an optical fiber cleaving tool.

The members are preferably "O" rings and may comprise elastomeric or elastomeric coated "O" rings. In an alternative configuration resilient members are used, for example a simple leaf spring which acts against the fiber end. The resilient member may be coated with an elastomeric material to protect the fiber being held.

One example of the use of this soft clamping technique is in a hand tool for cleaving optical fibers which hand tool comprises a handle; a bed pivotally mounted to the handle providing the reference plane for cleaving of an optical fiber; an anvil pivotally located with respect to the reference plane and including fiber deflector means that is designed to extend into a throughway provided in the reference plane; means to locate an optical fiber to be cleaved with respect to the reference plane so that it extends across the throughway in the reference plane; one or more means of clamping the fiber to the reference plane on either side of the throughway; and a cleaving blade arrangement located to scratch the optical fiber as it extends across the throughway in the reference plane wherein an end section of the optical fiber having the coating stripped therefrom is located in the means to locate and so extends over the throughway and when the hand tool is operated the anvil pivots with respect to the reference plane so that the at least one elastomeric member or elastomeric coated member engage the reference plane immediately adjacent the throughway soft clamping the optical fiber and the optical fiber deflector means in combination with the sides of the throughway deflects the optic fiber in a first direction on one side and in a second direction on the other side from its natural path inducing the necessary internal stresses in the optical fiber in the region across the throughway and the blade scratches the optical fiber to effect the cleaving of the optical fiber.

It will be appreciated that resilient means may also be used to clamp the fiber(s) against the second surface on one or both sides of the throughway. The clamping of the fiber(s) may be "hard-", "soft-" or "non-trapping-" clamping on one or both sides of the throughway provided that controlled internal stresses are induced across the core of the fiber for control of the cleaving.

The means to locate the optical fiber may comprises location dowels arranged in pairs wherein the optical fiber is disposed between the respective dowels of a pair for locating the optical fiber. The dowels will normally be arranged in pairs located at discrete points along the length of the natural path of the optical fiber and preferably are disposed on both sides of the throughway respective of the natural path of an optical fiber.

The spacing between the dowels in a pair of dowels may be set to allow passage of the coated fiber or the glass strand of the fiber only and thereby provide the means which positions the end section of a fiber to be cleaved and fixes it for the cleaving operation.

Consequently, with this embodiment the use of the "O" rings or elastomeric coated member in this manner to locate the end section of the optical fiber is not necessarily "hard clamping". The "O" ring or elastomeric coated member grips the optical fiber by the very nature of the material from which it is formed and places a pressure on the fiber causing bending of the fiber and so controlled internal stresses across the cores of the fibers.

The throughway may be provided with side depressions which in the operation of the tool at least one elastomeric member or elastomeric coated member locates and traps the fiber The "O" rings or elastomeric coated member may be configured in a group or as one or more discrete members or groups. In one arrangement of the invention "O" rings are provided on both sides of the throughway. It will be appreciated that the "O" rings may be provided on one side of the throughway only. These configurations equally apply to the use of elastomeric coated members.

The "O" rings may be arranged so that they engage the optical fiber via the outer side wall, such they are standing up, or in an alternative configuration they may arranged on their side so that diametrical opposed side portions of the "O" ring engage the optical fiber, such that they are lying down.

In all of the above examples, the tool may also include a pre-clamping member which clamps the coated optical fiber in place at a position remotely of the cleave area. The pre-clamping member may comprise a member pivotally mounted to the bed.

Alternatively, in all of the above descriptions, the fiber(s) may be contained within a ferrule(s) or other containing member(s), distant from or adjacent to the cleave area, wherein the ferrule is clamped and the fibers contained therein are therefore clamped.

The invention will now be described by way of example, with reference to the accompanying drawings, in which:

FIG. 1a shows a schematic representation of optical fiber lying in its natural path;

FIG. 1b shows a schematic representation of optical fiber cleaving apparatus in accordance with the present invention;

FIG. 1c shows a schematic representation of optical fiber cleaving apparatus in accordance with the present invention;

FIG. 1f shows a two arm anvil arrangement suitable for use with the present invention:

FIG. 5b shows a cross-sectional view of the stripper shown in FIG. 5a;

FIG. 14 shows a schematic representation of optical fiber deflected by the anvil in to the opening of the reference plane to form an angled cleave;

FIG. 15 shows a schematic representation of optical fiber deflected by the anvil in to the opening of the reference plane to form a near perpendicular cleave; and FIG. 16 shows an alternative anvil arrangement;

Figure 1D:
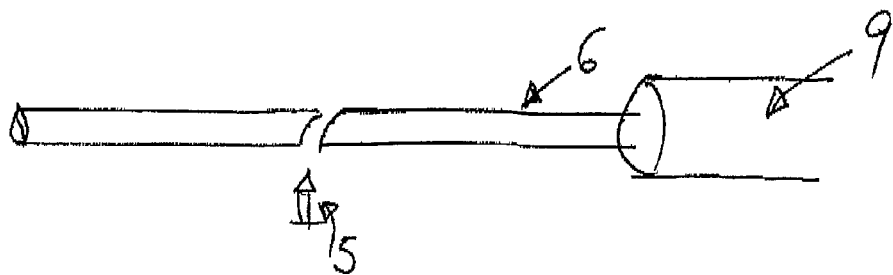
FIG. 1d shows a schematic representation of cleaved end of the optical fiber after cleaving.

Now referring to FIG. 1 of the drawings, there is shown a schematic representation of cleaving apparatus made in accordance with the present invention. The cleaving apparatus 1 includes remote pre-clamping means 2, optical fiber directing means 3, an anvil 4 and a cleaving blade 5. The optical fiber directing means 3 comprises two plate members 8 which confine the optical fiber.

In use, an optical fiber 6, optionally including a coating 9, that has an end section 7 that is deployed through the clamping means 2 by the anvil 4, past the blade 5 and between the plates of the optical fiber directing means 3. The fiber is deployed so that the end section 7 over which the coating has been removed is in the vicinity of, or adjacent to, the cleaving blade 5.

FIG. 1a shows the fiber lying in the apparatus in its natural path—i.e. not yet deflected. This defines the natural position of the optical fiber 6 in the apparatus wherein it is loosely located and is free from tension or stress. The optical fiber may be deployed in any locating means provided in the apparatus, for example a groove provided in the pre-clamp 2 or the optical fiber directing means 3.

In operation, as shown in FIG. 1b, the pre clamp 2 is activated, holding the coated optical fiber 6 in position. The anvil 4 moves in the direction of arrow A deflecting the optical fiber 6 from its natural path and forcing it downwardly towards the cutting blade 5. The confinement of the optical fiber 6 in the optical fiber directing means 3 causes the fiber 6 to re-bend and so inducing internal stresses to form in the optical fiber in the region of the adjacent the bending of the fiber 6. In operation the amount of the deflection induced in the fiber is dependent on the size of the glass strand of the fiber, with greater deflections required for smaller fiber diameters and vice-versa. Typically, deflections in the range of 0.02 mm to 2 mm are used for 125 micron diameter fiber for spacing between the anvil 4 and the fiber directing means 3 of 0.2-100 mm for angled cleaving and anvil widths of 0.2-100 mm for perpendicular cleaving. Typically the deflective force applied is no more than 0.1 to 1 Newtons.

The above description describes cleaving of a 125 micron fiber but it will be well understood that this is simply to exemplify the current invention and the method and apparatus may be used on any size of fiber.

Cleaving may be carried out for larger fiber of up to 3 mm in diameter, using smaller fiber deflections for the same spacing or larger spacings for the same deflection, than for 125 micron diameter fiber exemplified above. Cleaving is carried out for smaller fiber as small as 30 microns in diameter, using larger fiber deflections for the same spacing or smaller spacings for the same deflection, than for 125 micron diameter fiber."

In addition as the anvil deflects the fiber and the blade scratches the surface of the fiber the fiber is pulled longitudinally of its length adding further to the stresses generated in the fiber 6 if the fiber is "hard-" or "soft-clamped" by the fiber deflecting means 3. In the case of "non-trapping" clamping, no overall tension is induced in the fiber because the fiber can slip through the clamps. However when the fiber is "non-trap-" clamped on both sides of the cleaving point, i.e. the fiber is free to move through the cleaving apparatus, cleaving can also be effected.

The internal stresses induced in the fiber 6 may be controlled by the degree of deflection etc, the degree of the longitudinally extensive force applied and the curvature of the deflection to suit the particular type of fiber to be cleaved so that stress is present in the deflected optical fiber 6 at least across its optical core in the region of the blade 5.

With the fiber deflected in the general manner indicated the blade 5 is caused to scratch the surface of optical fiber 6 and the cleave induced. In order to cleave the fiber the cleaving blade is operated in the normal fashion and with the normal consideration with regard to the stresses induced in the optical fiber such that once the fiber has been scratched in the normal manner the cleave will be completed across the core of the fiber FIGS. 1a, 1b of the drawings illustrates the general fundamentals associated with the operation of the present invention. The general principle of the invention is suitable for producing either perpendicular or angled cleaves (up to 8°) and its use is broad. The driving force may have been for terminating optical fiber for use in the telecommunications field but the principle has application outside of this field also.

Figure 1E:
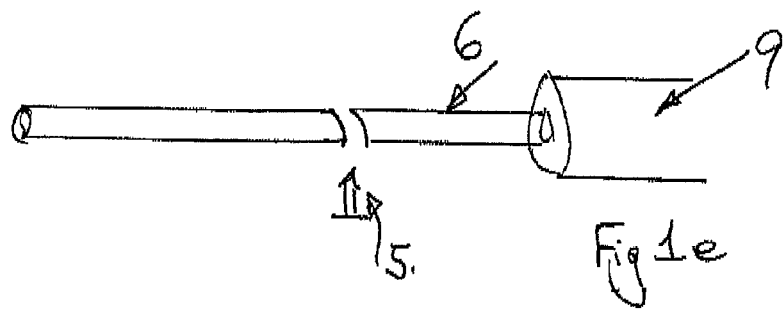
FIG. 1e shows a schematic representation of cleaved end of the optical fiber after cleaving.

In the case where a perpendicular cleave is desired then a single arm post arrangement would be preferable for cost reasons. This does not negate the possibility of chieving angled cleaves and the angled cleaved faces shown in FIGS. 2 and 9 may also be obtained from scratching the fiber(s) at a point where the anvil is located between the cleave point and the clamps 2, as shown in FIG. 1b. The path of the cleave is angled towards the point of contact of the anvil so that the end of the fiber which is later used (the working end, on the right side of FIG. 1) is rounded, as shown in FIG. 1d. It is also possible to scratch the fiber at a point between the point of contact of the anvil and the clamps 2, as shown in FIG. 1c. The resultant cleaved end is also angled, with a shape inverse and matching to that of FIGS. 2 and 9, but the direction of the cleave is again towards the point of contact of the anvil and so, especially for end angles of greater than about 5 degrees form the perpendicular, the end of the fiber which is later used (the working end, on the right side of FIG. 1) has a fragile protrusion, as shown in FIG. 1e. Such protrusions are generally not desirable, but this configuration is advantageous in certain applications because the resultant cleaved end has not been touched by the anvil so is potentially higher strength without any damage. The protrusion can be reduced by tensioning the fiber during cleaving and using "hard-clamping".

Further in each of the drawings referred to above and as follows the anvil is shown as a simple post. This was to show the location of the anvil and had no intended implication that the invention was only suitable for use with a single pole or arm anvil. The invention is suitable for use with any conventional anvil and the actual choice of the anvil that is made will depend on the application to which the cleaving apparatus is designed for.

However where an angled cleaved is desired a two arm arrangement would be more suitable and may be adopted. This type of arrangement is shown in FIG. 1f of the drawings and provides an alternative way of achieving angled cleaves to that described above for a single post system. In this particular arrangement the two arms of the anvil have different heights and this difference in heights sets the standard cleave angle for the anvil. The cleave angle can then be adjusted by rotation of the anvil about a fulcrum to exacerbate the difference in height or reduce the effects of the difference in height.

Figure 2:
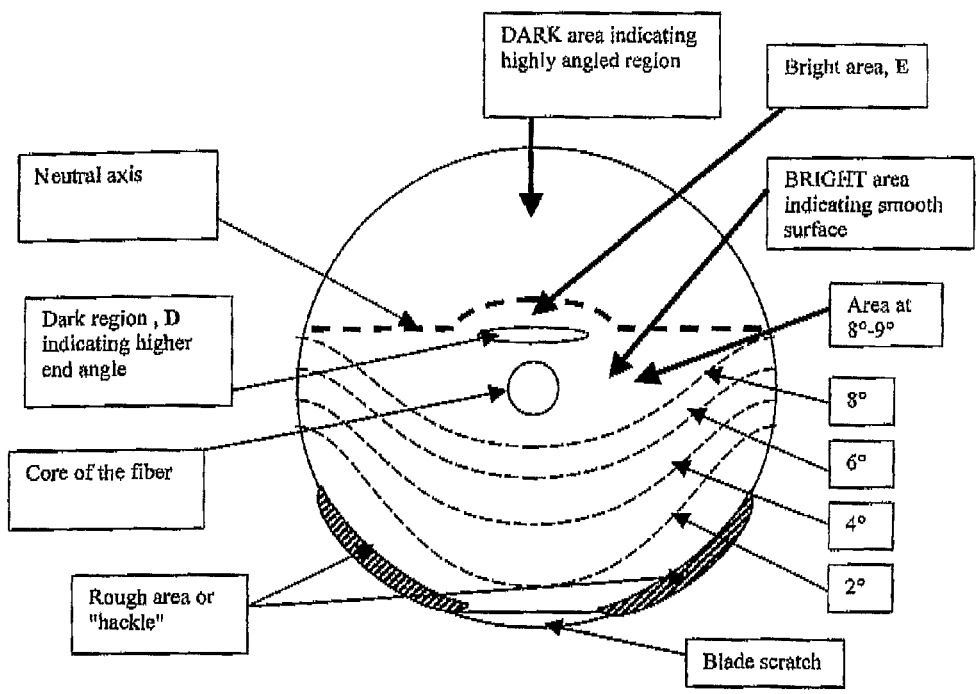
FIG. 2 shows a schematic representation of a cleaved fiber end.
Figure 9:
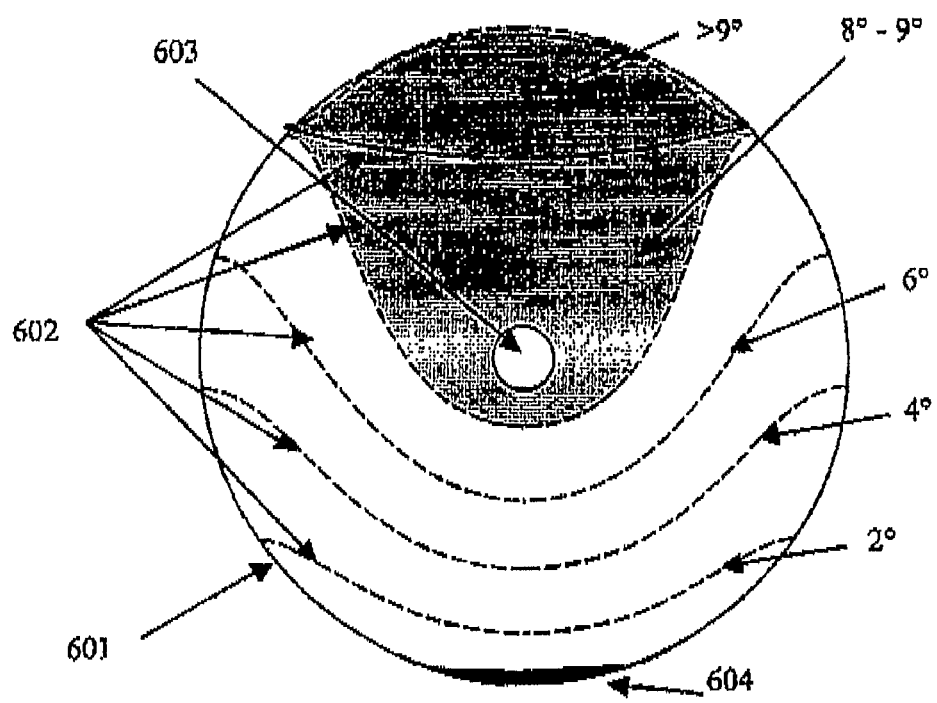
FIG. 9 shows the shape of the end angle obtained.

Now referring to FIG. 2 of the accompanying drawings there is provided a schematic representation of an angled cleaved end face of an optical fiber made in accordance with the present invention, showing the contours of equal end angle (as measured by interference microscopy), the core of the fiber and the initiation scratch. In this case the fiber has been clamped with a "non-trapping" clamp. FIG. 9 shows a similar angle cleaved end face in which "hard clamping" has been used. It can be seen that the "hard clamped" cleaved surface is less rounded in the region distant from the initiation scratch, but "non-trapping", "hard clamping" and the intermediate "soft-clamping" all give controlled cleaves in which the core of the fiber is angled at about 8° away from the perpendicular, so eliminating back-reflection.

Now referring to FIGS. 3 to 11 of the drawings there is described a cleaving technique suitable for use with ribbon fiber arrays.

A ribbon fiber window-stripping apparatus according to the present invention comprises:
  an electrically powered, thermal stripping tool 101, commercially available from Sumitomo Electric or otherwise
  a stretching cradle 201 which serves to hold the thermal stripper to allow smooth operation and limit the distance the fiber coating 10, 11, 12 is slid along the fibers 13
  a movable clip 301 to hold the ribbon fiber 10 during stripping and in which the window stripped fiber 10, 21, 22 is transferred to the cleaving unit 504, 301, 501

Figure 5A:
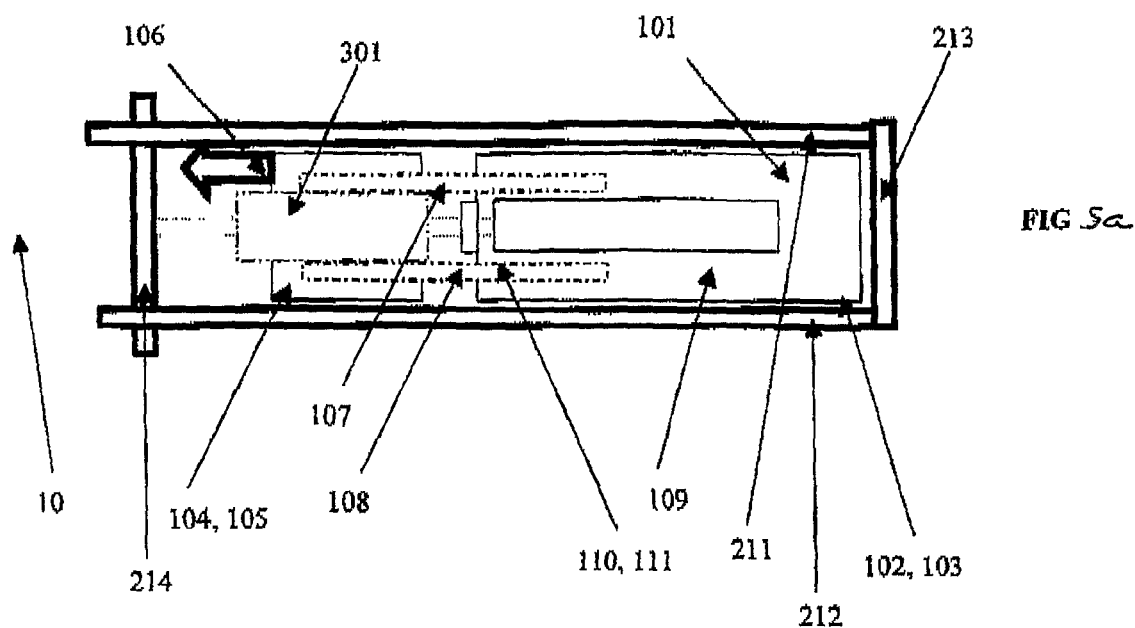
FIG. 5a shows a plan view of the thermal stripper suitable for use with this invention in the manufacture of a ribbon cleave; where the stripper is shown placed in a cradle
Figure 5B:
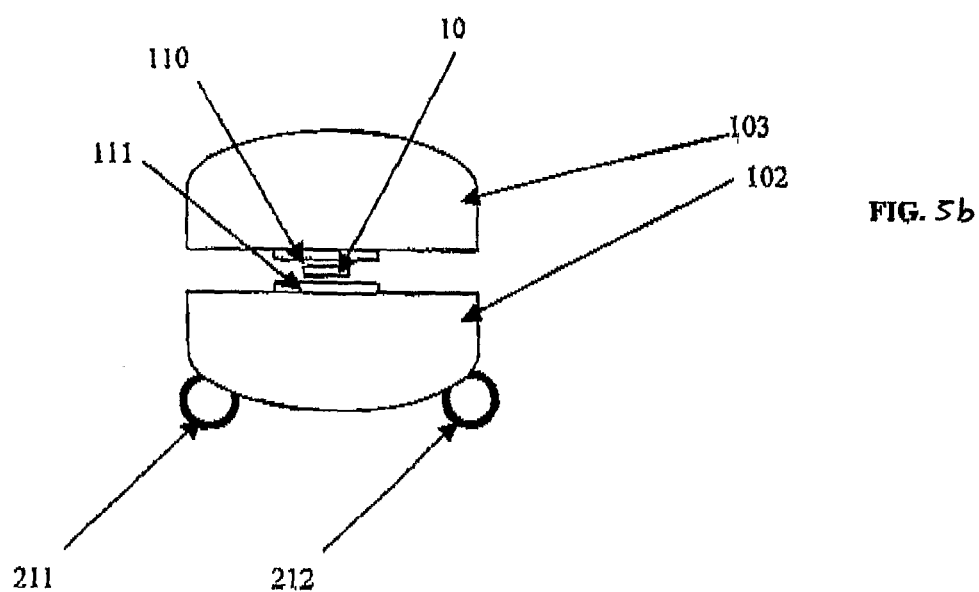

The thermal stripping tool 101 is shown in FIGS. 5a and 5b in plan view and in cross-section, respectively. It is made up of: a lower and upper base section, 102, 103 with an upper and lower slider section 104, 105, whereby the slider section is normally closed but can be moved in direction 106, sliding on rails 107,108, in order to pull off the coating. A heater strip 109 is incorporated in the lower base section 102 and is used to raise the temperature of the encapsulated fiber to weaken the bond between the coating and the glass of the fibers. The tool must be left in heating mode for approximately 15 minutes after switch-on to warm up. Blades 110, 111 are used to cut through the heated coating so that the coating can be pulled off as a tube.

The stripping tool is first used to remove fully the distal end of the coating, as follows. The coated ribbon fiber 10 (see FIG. 3), with its encapsulation 11 surrounding the individual coating of the fibers 12, the glass fibers 13 and their cores 14, is placed in the movable fiber clip 301 with approximately 20 mm of coated fiber ribbon protruding from the end of the clip. The clip and fiber are then loaded in to the stripper where the stripper's slider section 104, 105 is fully closed against the stripper's base 102, 103. The lids of the base 103 and the slider unit 105 are then closed such that the protruding fiber is heated by the heater strip 109 in the base unit 102 and the fiber clip is securely held and pressed together by the top and bottom 104, 105 of the slider unit. After a period of approximately 5 seconds, the fibers are sufficiently warm, having reached the stripper's set temperature of about 85°-90° C., and can be stripped. This is done by pressing together the top and bottom of the base unit 102,103 so that the opposing blades 110, 111 partially cut in to the coating 11, 12 of the ribbon. The slider unit's top and bottom 104,105 are squeezed together, gripping the clip and fiber, and pulled along its rails 107, 108 away from the base unit until it reaches the end of the rails, so fully stripping the distal end of the fiber ribbon. The stripped fiber in its clip is removed and the stripped coating removed from the tool. Because of the position of the cutting blades in the stripper, approximately 3 mm of coating remains protruding from the clip and approximately 17 mm of stripped fiber makes up the distal end of the ribbon. FIG. 4a. shows the stripped fiber resulting from the first operation of the tool with the stripped fibers 20 and the unstripped coating 10.

The ribbon fiber is repositioned in the movable clip 301 so that approximately an extra 10 mm of coating protrudes from the clip, as well as the length previously stripped. The clip and the repositioned fiber are then replaced in the stripping tool. The stripping tool 101 is then placed in a cradle 201 so that the coating can only be slid a short distance along the fiber. The stripping tool 101 is placed on top of the rails of the cradle 211, 212, butting up against the cradle end 213.

A second operation of the tool is carried out, comprising: loading the fiber and clip into the tool, closing the two lids, waiting for 5 seconds for the fiber to warm up, pressing together the top and bottom of the base unit to cause the opposed blades to partially cut the ribbon, and finally pressing together the top and bottom 104, 105 of the slider unit to grip the clip and sliding it away from the base unit along the rails 211, 212 in the cradle until it hits the adjustable end stop 214.

The stop 214 limits the length by which the second piece of coating is removed from the fibers. Consequently a coating glove 22 remains on the stripped fibers 21 (see FIG. 2b). The stop 214 is adjusted so that approximately 10 mm length of fibers is window-stripped and approximately 10 mm of coating glove remains on the stripped fiber. When the clip 301 and stripped fiber is removed from the stripper, the coating glove cools down and reforms a bond with the glass of the fibers.

It will be understood that the second stripping action leading to the formation of the coating glove can also be carried out using the stripper without the cradle 211, 212.

The coating glove should be well formed and it should not buckle the fibers therewithin. Only if the coating glove is well formed can it be placed in the fixed clip 501 of the fiber cleaver. Factors that lead to a poor coating glove include:
  low temperature of stripping tool—leave for 15 minutes after start-up before using
  non-axial motion of the slider unit but this is substantially improved using the cradle and sliding the slider unit along the rails
  incomplete stripping of the encapsulation is often caused by insufficient clamping force to grip the fiber ribbon.

The tool can window-strip ribbons containing between 1 and 24 fibers or more.

Figure 3:
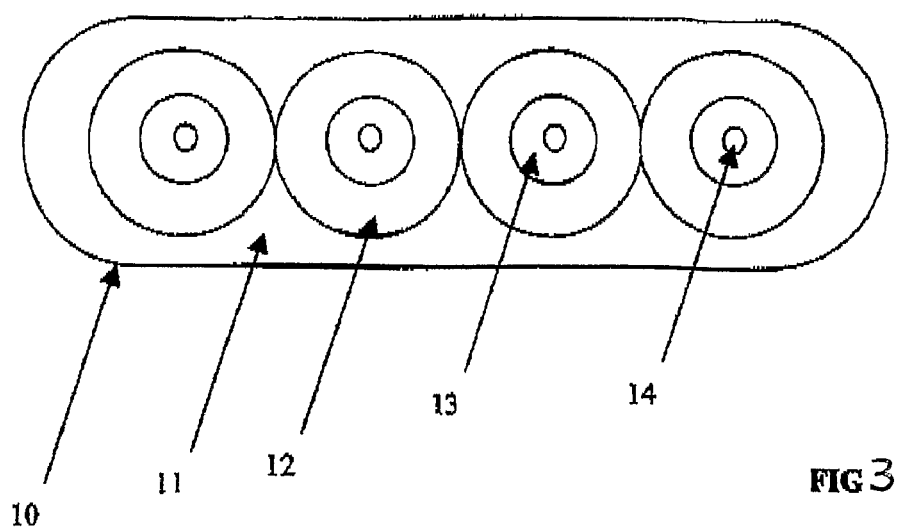
FIG. 3 shows a cross-sectional view of a 4-fiber ribbon with primary coating around each fiber and all 4 fibers enclosed by an encapsulation.
Figure 4A:
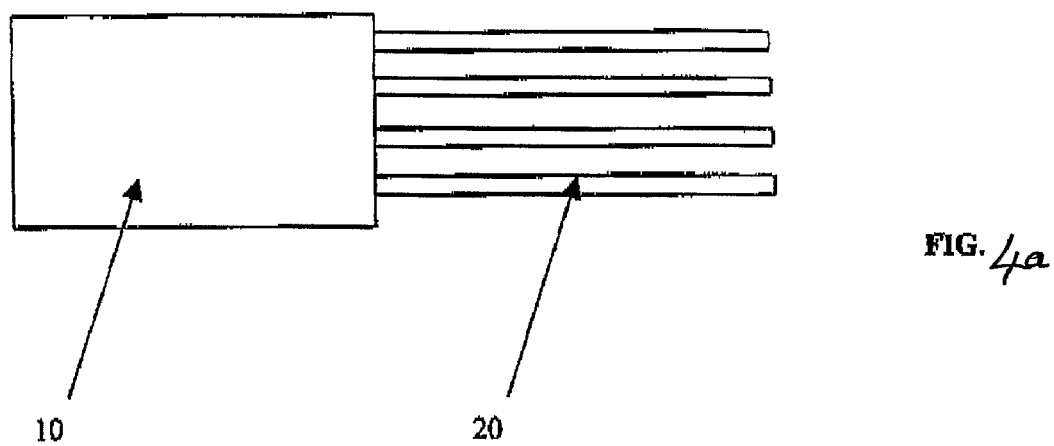
FIG. 4a shows a fiber ribbon with its distal end stripped.
Figure 4B:
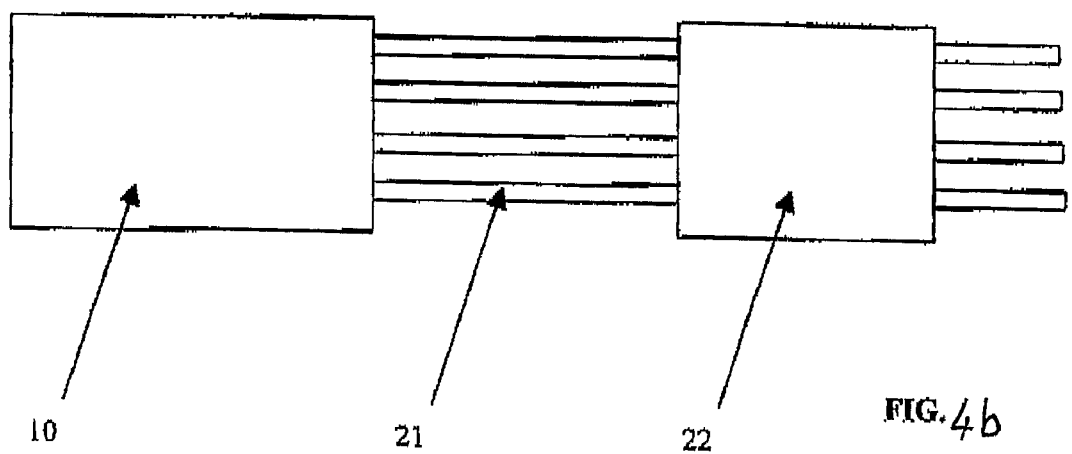
FIG. 4b shows a fiber ribbon with a coating glove.
Figure 11:
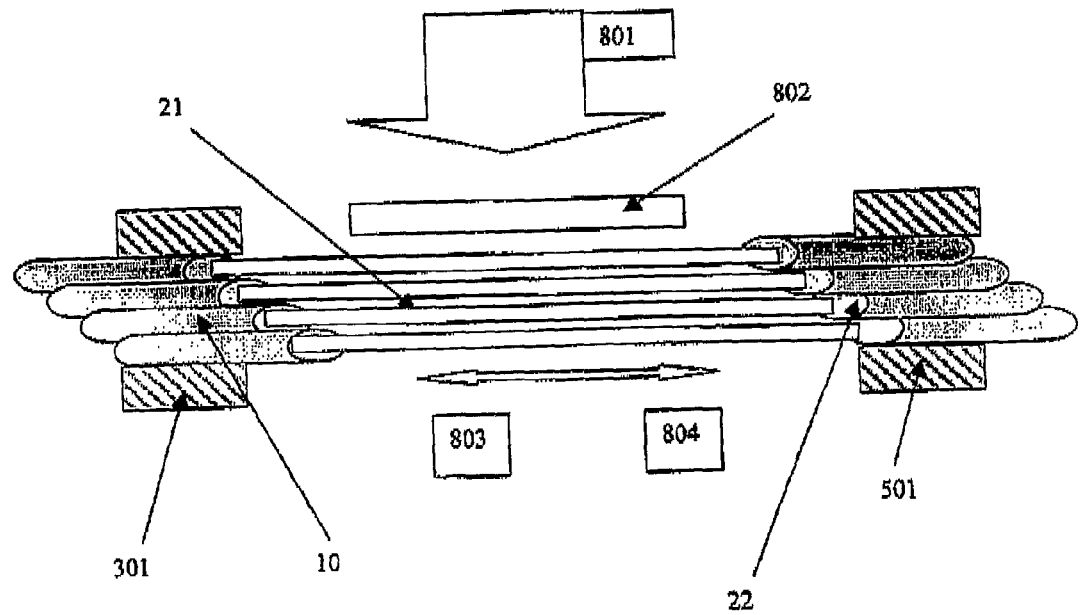
FIG. 11 shows a window-stripped fiber clamped through its coating.

Various applications of the apparatus described and shown in FIGS. 3 and 11 are discussed in which the use of a window stripped coating glove is advantageous.

Figure 6:
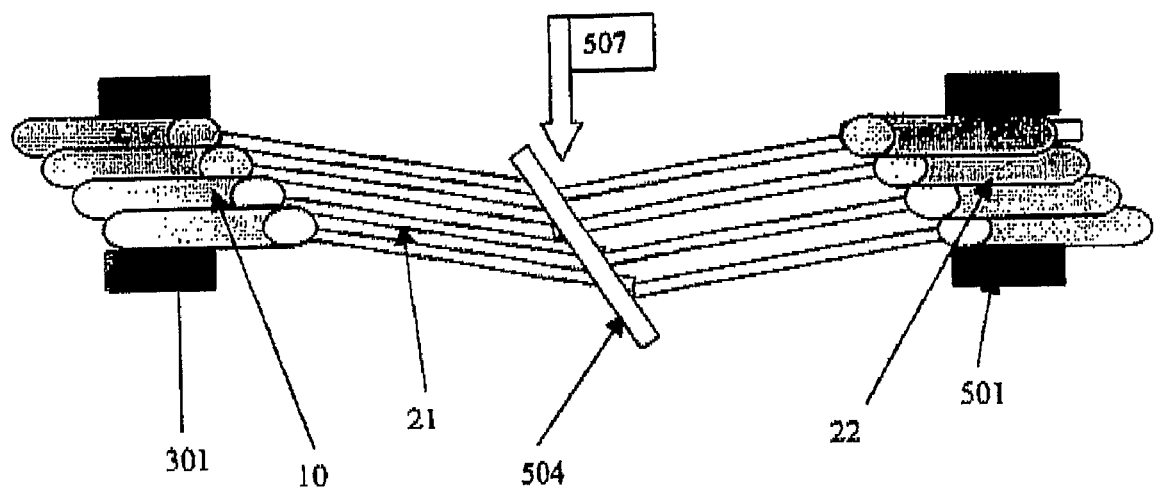
FIG. 6 shows a window-stripped fiber ribbon.

In one application, the window stripped fiber ribbon 21 can be placed in a ribbon fiber cleaver to create angled or perpendicular cleaved ends. FIG. 6 shows the window-stripped fiber clamped in to the cleaver with an anvil 507 tensioning and shearing each fiber in the ribbon with substantially equal forces on each fiber in the ribbon. The movable clip 301 containing the window-stripped fiber ribbon is placed in a cleaving jig (see FIG. 6, 7), in which the movable clip 301 is securely held in to the body of the cleaver and such that it is pressed up against a stop 502 to ensure a consistent cleave length. Such securing means can be achieved by a magnetic arrangement, by a clip arrangement or otherwise.

The coating glove 22 is held by a second clip 501 that is fixed to the cleaver body. When the clip is closed, the coating glove is securely closed. Provided the window stripping has been carried out to produce a clean coating glove that avoids buckling the fibers, the coating glove is clamped by the fixed clip such that the stripped fibers lie straight and unbuckled in the cleaver. The two clips serve to clamp the fiber coatings and therefore serve to clamp at two points each fiber contained within the coating In one application of this invention, the window-stripped ribbon fiber is placed in an angled cleaving jig, constructed according to the teachings of Murgatroyd, PCT/GB98/01598. An angled cleaved end is achieved by shearing a fiber or fibers between the abrupt edge 503 of a one-armed anvil 504 and the closely located edge 506 of the fixed clamp 501.

On operation of the cleaving tool, an anvil 504 moves in direction 507 to deflect laterally the window-stripped fibers clamped in their coatings at a point between the two clamps 301, 501 (see FIG. 6, 7). The anvil movement lengthens the fibers fixed between their two clamps and so tensions them. For a clamp spacing of about 10 mm and an anvil deflection in the range of 0.3-1.0 mm, the fibers are lengthened sufficiently to impart a tensile force of the order of 2 Newtons. The exact magnitude of the deflection required to create the appropriate tension is dependent on the compliance of the bond between the coating glove and the fibers, and so the fibers should be cleaved and examined and the deflection adjusted to obtain the correct tension for optimum cleaving.

Figure 7:
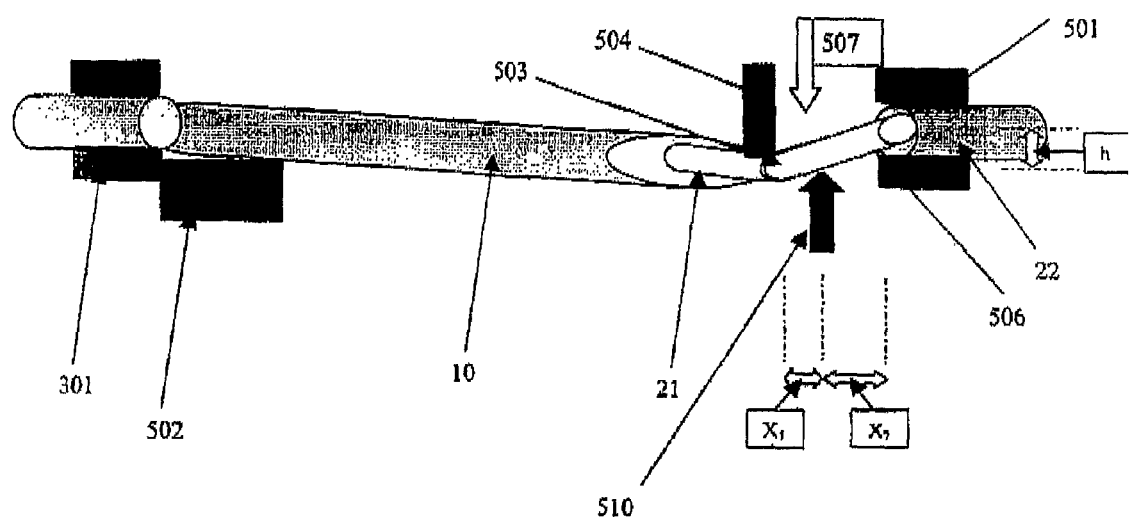
FIG. 7 shows the side view of a fiber ribbon.
Figure 8:
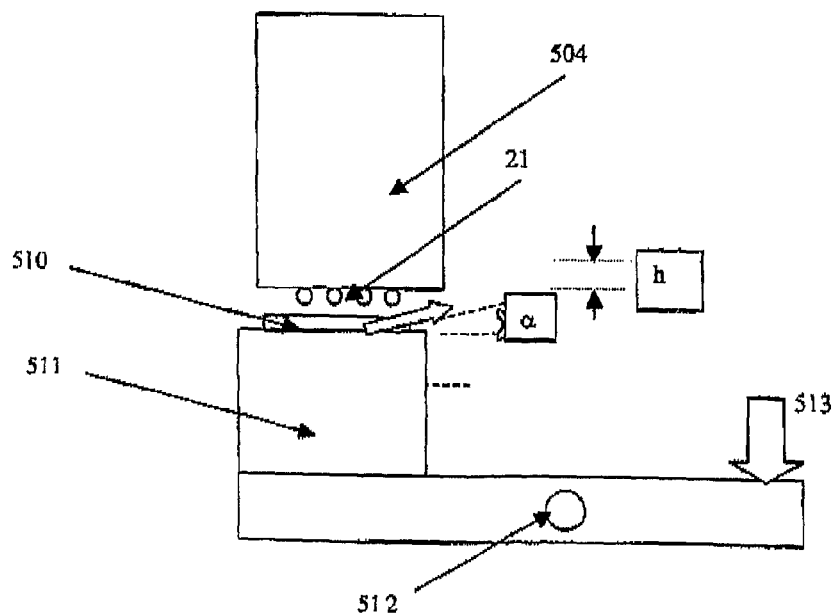
FIG. 8 shows a diamond blade scratching tensioned and deflected fibers.

The anvil movement also serves to shear the fibers between the edge of the anvil 503 and the edge of the fixed clamp 506 (see FIG. 7). The tensioned and sheared fibers are then scratched by a diamond blade 510 to initiate an angled cleave. The diamond blade may be moved to contact the stressed fibers or the action of deflecting the fibers can cause them to come into contact with the blade, or otherwise. In all cases the blade scratches each fiber to cause an initiator crack 604 which is propagated across each stressed fiber as a cleave. In FIG. 9, the blade 510 is mounted on its support 511 which swings about a pivot 512 and is actuated in direction 513, may move at a acute angle alpha, $\alpha$ to scratch the fiber (see FIG. 8), so reducing the cutting stresses or may fall away under the action of the scratching. Preferably the fibers should be scratched at a point where $x_1 < x_2$ at a point on the outside of the bend to allow easy penetration of the blade in to the fiber.

It has been found that it is possible to achieve end angles in the range of 1°-60° by altering the values of $x_1$, $x_2$ and h. The value of $x_1+x_2$ can be altered between 0.1 mm and approximately 3 mm. Satisfactory cleaves are not obtained for greater than 3 mm because of the flexibility of the 125 micron diameter fibers. Larger and smaller fiber diameters can be cleaved by suitable choice of $x_1$, $x_2$ and h.

The diamond blade 510 should preferably have a length at least as long as the width of the fiber ribbon, i.e. a length of greater than 1.0 mm for a 4-fiber ribbon. The height of the diamond blade can be adjusted so that the blade is horizontal at the point of scratching the fibers so that all fibers cleave almost simultaneously. This has advantages in maintaining consistent stresses in all of the fibers, giving more consistent cleave lengths. It also means that the movement of the diamond blade can be stopped soon after scratching so that the blade does not significantly touch the cleaved fiber ends.

The angle cleaved fiber ends 601 have a shape as shown in FIG. 9, showing the contours of equal end angle 602 (as measured by interference microscopy), the core of the fiber 603 and the initiation scratch 604. The center of the cleaved fiber is at a repeatable angle of about 8° away from the perpendicular. The angle of the core can be controlled by adjustment of $x_1$, $x_2$ and h, as taught in Murgatroyd.

The end angle of the core can be adjusted by changing the magnitude of the deflection h of the anvil, although such a change also affects the tension present in the fibers. Alternatively, the end angle can be altered without significantly changing the tension by changing the distance between the anvil edge and the edge of the fixed clamp, i.e. the value of $x_1+x_2$, either by moving the anvil or by adjusting the position of the fixed clamp.

The fiber ends so cleaved will have the same length with respect to the ribbon fiber clamped in the movable clamp 301, provided that the blade scratches the fibers in a direction orthogonal to their axes and that there is no slippage of individual fibers in the encapsulation. It has been found that the cleave lengths, i.e. the distance from the end of the coating to the point of the cleave, are equal for all fibers in a 4-fiber ribbon to better than 25 microns.

The position of the movable clamp 301 secured in the cleaver's body dictates the cleave length. The stop 502 against which the clamp 301 is secured can be moved, for instance by the use of an eccentric cam, to increase or decrease the cleave length. Fiber ribbons of different fiber count can be cleaved in the same tool by interchanging the left- and/or right-hand clamps suitable for the different widths of the different numbers of fibers in the ribbon.

It is a further advantage of this invention that the offcut fibers are held together by the remaining coating glove. This makes them very much easier to discard and contributes significantly to the Health and Safety Aspects of using this tool because loose fibers are not present.

Figure 10:
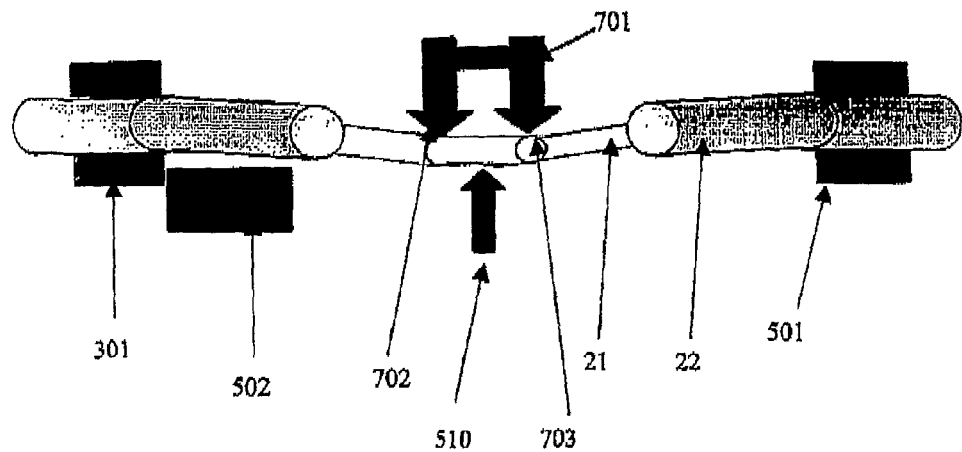
FIG. 10 shows the side view of a window-stripped fiber ribbon of FIG. 9 with a 2-armed anvil suitable for near-perpendicular cleaving.

In a second application, the window-stripped fibers can be placed in a ribbon fiber cleaver to create perpendicular ribbon cleaved ends, as shown in FIG. 10. The window-stripped fiber 21 (only 1 fiber of the ribbon is shown) in its clamp 301 is placed in the cleaver secured against a stop 502 and the coating glove 22 is secured in the fixed clip 501. The stripped fibers 21 are tensioned by deflection with an anvil 701 that has two arms 702, 703 where the anvil acts at a point between the two clamps. For a clamp spacing of about 20 mm, deflecting the fibers by about 1.0 mm will give a tension in each fiber of about 2N, as required to obtain an optimum cleave on 125 micron diameter fiber. The fibers are scratched by a blade 510 at a point between the two arms of the anvil 702, 703 and cleave giving ends that are mirror-smooth with angled ends close to the perpendicular. The angle of the cleaved ends can be adjusted to less than 0.5° from the perpendicular by adjusting the relative heights of the two arms of the anvil or the relative height of the clamps 301, 501 or the relative distance between the anvil arms and the clamps.

The ribbon fiber cleaves here obtained are consistently better than those obtained by competitor tools such as those made by Fujikura and others. This is because the fibers are all pre-tensioned prior to scratching and so the scratches have a well-controlled depth of only about 3 mm. Furthermore, the end angles achieved by this perpendicular ribbon cleaver are less than those of competitor cleavers because the fibers do not twist during clamping and cleaving.

In a third application, the window-stripped fiber ribbon can be placed in an apparatus to create Fiber Bragg Gratings in each fiber in the fiber ribbon. The encapsulation 10, 22 are clamped using clamps 301, 501 to locate the fibers. UV light 801 is directed on to the fibers 21 after passing through a phase grating 802. Provided that the fibers are photosensitised, e.g. by hydrogen loading of Ge-doped fiber cores, and the fibers are close enough to the phase masks, Fiber Bragg Gratings will be written in to the fibers. After writing the FBGs, the window-stripped fibers can be recoated to protect the glass from damage and moisture.

The window stripped fiber ribbon is particularly useful because the fibers in the ribbon can be securely clamped through their coatings at two points. Moving apart the two clamping points axially in directions 803, 804 or deflecting the fibers transversely with an anvil will serve to tension the fibers. If FBGs are written in to tensioned fiber, and the tension then released after fabrication, the operating spectral profile of the FBG will move to shorter wavelength compared to FBGs written in to untensioned fibers. The window-stripped fibers arising from this invention are well suited to being used to write FBGs using applied tension to control the operating conditions.

It is understood that although applications using window-stripped ribbons have been described for cleaving and FBG manufacturer, other applications also exist for window-stripped fibers.

It will be well appreciated by those skilled in the art the above description relating to a ribbon fibers describes a one arm/post anvil arrangement by implication. This has been done for illustrative purposes only and the broad description is equally applicable to two arm/post arrangements. In the case of a two-arm/post anvil, the angle of the core can be adjusted both by control of these parameters and also by variation of the angle formed by the differing heights of the anvil.

Figure 12:
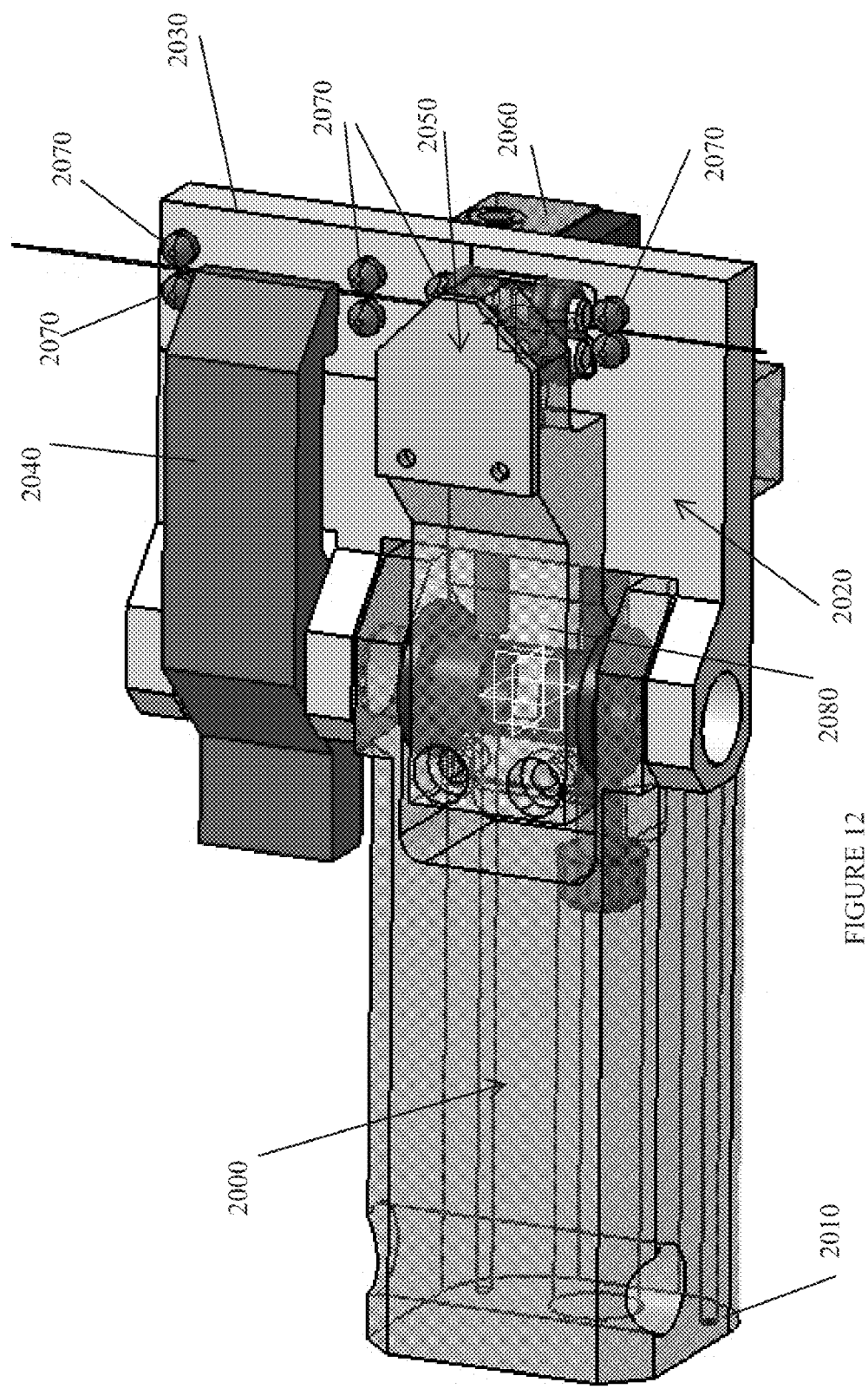
FIGS. 12 and 13 show a hand tools that operates in accordance with the present invention.
Figure 13:
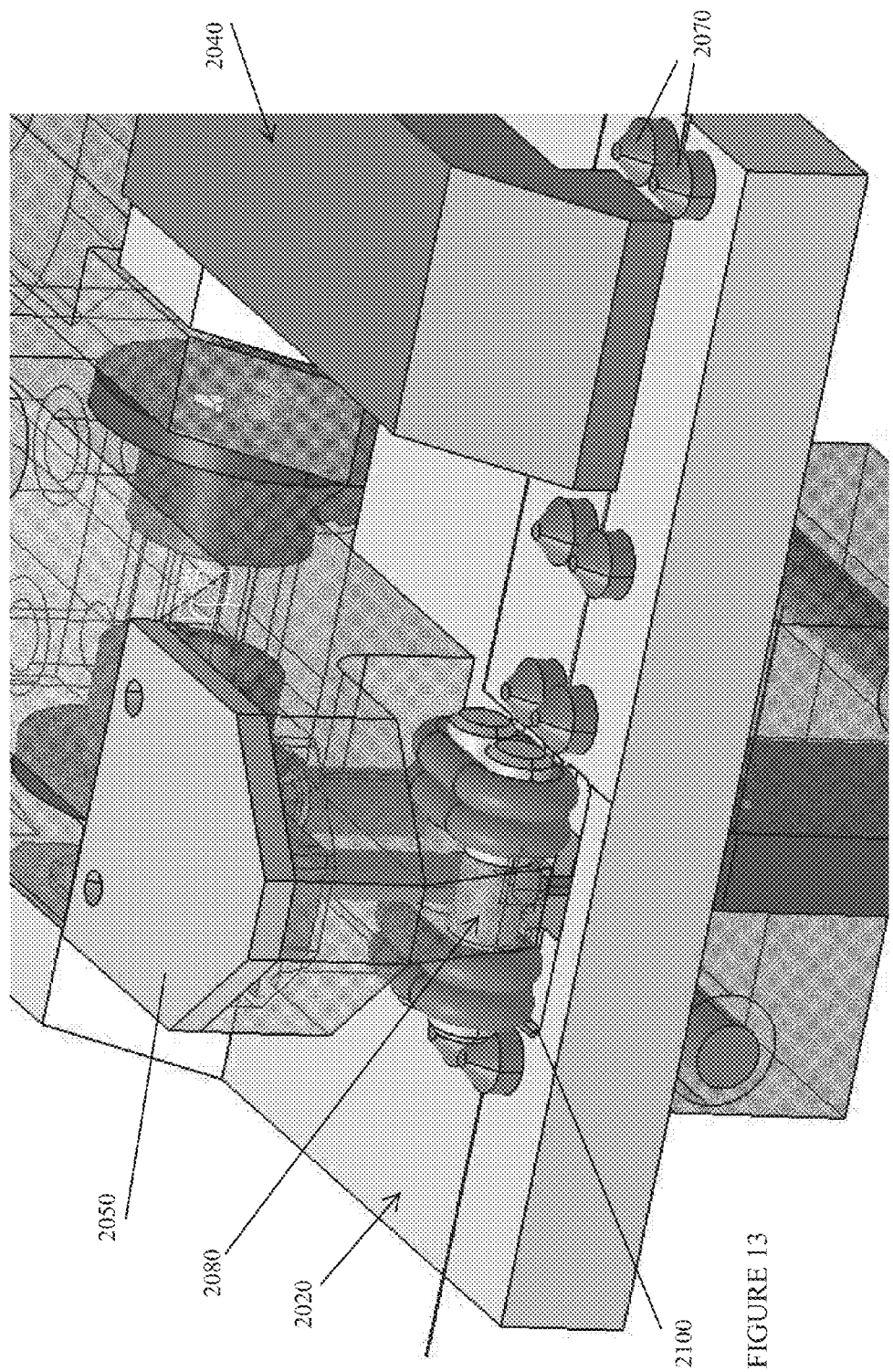

Now referring to FIGS. 12 and 13 of the drawings, there is shown a hand tool 2000 that operates in accordance with the present invention.

The hand tool is an optical fiber cleaving tool 2000 which includes:
a handle 2010;
a reference plane bed 2020 pivotally mounted to the handle 2010, and having a sideward projecting section 2030 and a cleaving hole 2100 located at the end of the plane remote from the pivotal mounting to the handle 2010 but in line with the handle 2010;
a pre-clamp 2040 pivotally mounted on the sideward projecting section 2030 of the reference plane 2020;
an anvil 2050 mounted substantially in line with the handle 2010 on the upper side of the reference plane so that when operated the anvil will co-operate with the cleaving hole;
a blade mounting block 2060 mounted on the lowermost side of the reference plane 2020 in close proximity to the anvil 2050;
eight locating dowels 2070 provided in four spaced apart pairs in alignment with one another and running along the side of the reference plane remote from the pivotal mountings so that an optical fiber mounted in the dowels will extend over the cleaving hole 2100 and such that the spacing between the dowels immediately adjacent the cleaving hole 2100 will only accept the end section of the fiber; and
optical fiber cleaving means 2080 including a blade advance screw 2090.

The cleaving blade mounting block 2060 is mounted on the underside of the reference plane bed 2020 at a position directly below the anvil 2050 and in relation to a hole provided in said reference plane bed 2020.

The optical fiber cleaving means 2080 is mounted to the blade mounting block and projects into the cleaving hole 2100. Mounted to the sides of the anvil 2040 are four elastomeric "O" rings mounted in two distinct groups of two 2110, 2111 and 2120, 2121.

In operation an optical fiber having an end section with the coating removed is deployed between the dowels 2070 thereof is placed in the hand tool so that the fiber extends between the four pairs of locating dowels 2070. The fiber may then be pulled so that the coating of the fiber abuts the locating dowels 207 adjacent the cleaving hole 2100 and the end section is correctly position and extends over the cleaving hole 2100.

The coated fiber is clamped in position by deployment of the pre-clamp 204 and the optical fiber is securely locked in to position on the reference plane.

The hand tool is operated and the anvil 2050 deployed so that the elastomeric "O" rings engage with the optical fiber deflecting it into the indentations 2111 at the sides of the hole 2100 soft contacting the fiber and securing the fiber in position for cleaving. The "soft" clamping "O" rings engage the fiber preventing slippage of the fiber.

Further as the anvil 2040 is deployed the cleaving means extends into the cleaving hole 2010 and deflects the optical fiber into the cleaving hole 2100. The interaction of the edges of the cleaving hole 2100 and the cleaving means, means that the optical fiber is deflected in a first direction as it starts to cross the cleaving hole and a second direction as it leaves the cleaving hole 2100.

The blade of the cleaving means 2080 is deployed to scratch the fiber in the cleaving hole and therefore in the region where the internal stresses have been induced in the optical fiber a cleave is effected.

In the example of the hand tool described the "O" rings are deployed in a vertical orientation so that the outer surface of the "O" engages the fibers. It will be appreciated that this is only one configuration for the deployment of the "O" rings and in a second arrangement the "O" rings may be deployed on their sides so that the sides of the "O" rings engage the optical fibers.

It will be understood that one rather than two "O"-rings can be used on either side of the cleaving hole 2100 to soft clamp the fibers. Furthermore, the "O"-ring on the side of the cleaving hole adjacent to the remote clamp 2040 can be eliminated, using only a single "O"-ring on the offcut side of the fiber, because the remote clamp 2040 will adequately clamp the fiber on this side of the cleaving hole, allowing tension to be present in the cleave. The fiber(s) are deflected from their natural path in to an "S"-shaped bend, giving a cleaved end face characterised by a mixture of FIG. 2 and FIG. 9.

A further embodiment can be understood in which the clamping is "non-trapping". The "O"-ring or other plate can contact the fiber on the offcut side to cause a re-bend of the fiber in to an "S"-shape without trapping the fiber hence no overall tension will be present in the fiber. Angled cleaving will occur with an end face as characterised by FIG. 2. The fiber may be secured with a remote clamp 2040 or may be entirely free to move through the cleaving apparatus, employing non-trapping clamps on both sides of the anvil.

It will be understood that any of the clamping methods described herein can be used to clamp and cleave arrays of ribbon fiber. The stresses induced in all of the fibers and hence the shape of the resultant cleaves will be essentially identical in all fibers in the ribbon. A scratching blade means is required to form initiation scratches in each fiber in the ribbon.

The hand tool here described can also be used to effect substantially perpendicular cleaves for both single and ribbon fibers. The fiber is clamped on either side of the cleaving hole using "O"-rings. Alternatively, the fiber may be clamped by a single "O"-ring on the offcut side and the "O"-ring on the side of the cleaving hole adjacent to the remote clamp 2040 can be eliminated because the fiber will be trapped by remote clamp ensuring tension is present in the fiber(s) giving a good cleave. As shown in FIG. 15, the anvil will have two arms, as shown in FIG. 10 and the resultant stresses in the fiber will be axial leading to a near-perpendicular cleave. The angle of the cleaved ends can be adjusted to less than 0.5° from the perpendicular by adjusting the relative heights of the two arms of the anvil, and/or the relative distance between the anvil arms and the sides of the cleaving hole and/or the relative heights of the two sides of the cleaving hole.

FIG. 16 shows an alternative arrangement for holding the fiber in which the O rings (2110 etc) are replaced by one or more resilient bent members 2110'. All the other number are used to indicate like components to those described with regard to FIGS. 12 to 15 of the drawings. These resilient members 2110' may be coated with an elastomeric material to protect the fiber held by the member. The resilient member is formed to apply exactly the right force to the fiber to be gripped with the elastomeric material cushioning the fiber and protecting it against damage by the member 2110'

In a further arrangement the O rings could be replaced with shaped rubber blocks which could be glued in position and frozen to enable them to be formed into the correct shape.

Further the anvil 2050 shown in this drawing is a two arm anvil so the hand tool is suitable for the forming of angled cleaves.

Figure 17:
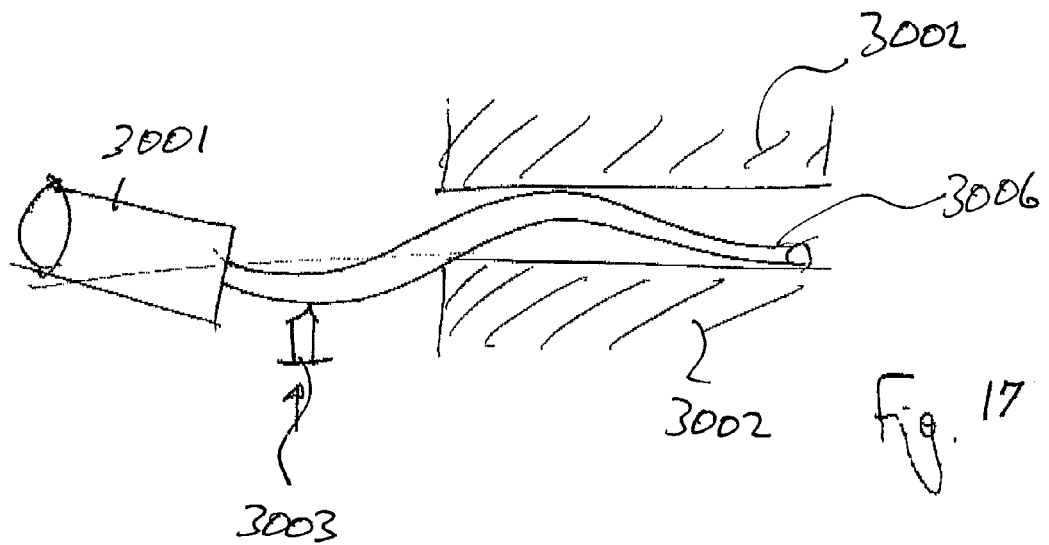
FIGS. 17 and 18 show alternative methods of re-bending the fiber for cleaving in accordance with the present invention.
Figure 18:
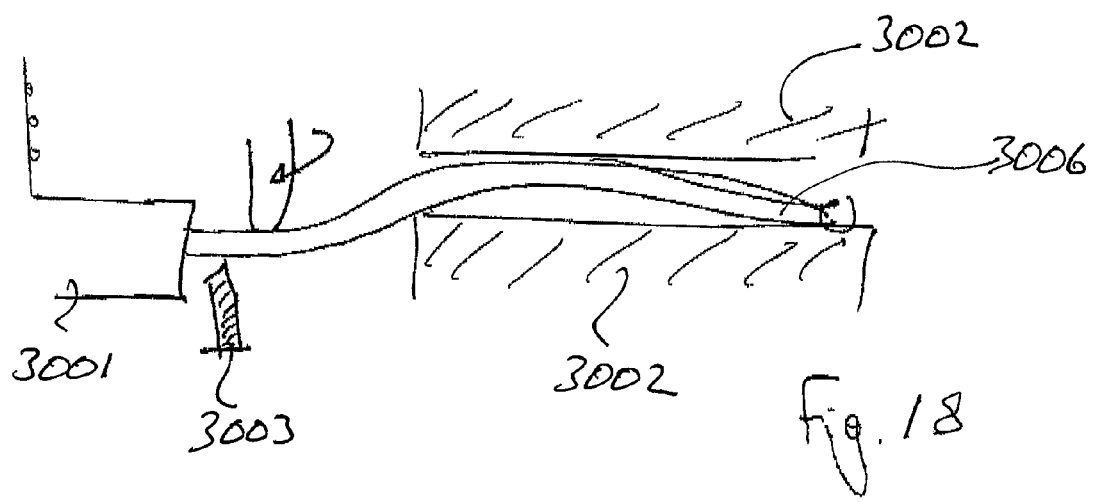

FIGS. 17 and 18 of the drawings show an alternative method of re-bending the optical fiber. In this arrangement the end of the optical fiber 3006 is located between plates 3002 so that it is loosely housed and not trapped. The protruding end of the optical fiber is located in a ferrule 3001 that is moved to induce an S-bend in the optical fiber. The optical fiber may then be presented for cleaving in the normal manner.

FIG. 17 shows an arrangement where an angled cleave is desired and in this case the ferrule position may be adjusted so that blade 3003 scratches the fiber so as to induce a cleave at the correct angle. FIG. 18 shows an arrangement where the desired cleave is perpendicular and in this embodiment a further component issued, for example the anvil, to present the optical fiber at the correct angle for perpendicular cleaving.

The invention claimed is:

1. Apparatus for cleaving an optical fibre in which the optical fibre passes through the apparatus along a natural path and has an end section thereof in which the glass strand of the fibre is exposed, the apparatus comprising:
   a reference plane bed defining a cleaving hole, the reference plane bed mounted about a pivot axis;
   an anvil configured to extend into the cleaving hole to deflect the fibre, the anvil pivotally mounted with respect to the reference plane bed about the pivot axis;
   a pair of resilient members adjacent to the anvil and configured to move with the anvil and trap the fibre against the reference plane bed on either side of the cleaving hole;
   a cleaving blade mounted in line with the cleaving hole and configured to be movable with respect to the cleaving hole;
   wherein the resilient members and the anvil are configured to deflect the optical fibre against the reference plane bed to induce the fibre to re-bend to induce internal stresses in the fibre over a region of the length of the fibre, and the cleaving blade is configured to scratch the surface of the fibre in the region and induce the cleave.

2. The apparatus of claim 1 wherein the reference plane bed has a single degree of freedom.

3. The apparatus of claim 1 wherein the reference plane bed defines a pair of indentations, each indentation adjacent to the cleaving hole on opposed sides of the cleaving hole.

4. The apparatus of claim 1 further comprising location dowels arranged in pairs and extending from the reference plane bed, wherein the fibre is disposed between the respective dowels of a pair for locating the optical fibre on the reference plane bed.

5. The apparatus of claim 1 further comprising a pre-clamp positioned at an end region of the reference plane bed and configured to clamp the fibre to the reference plane bed.

* * * * *